United States Patent
Naganuma et al.

(10) Patent No.: US 7,635,659 B2
(45) Date of Patent: Dec. 22, 2009

(54) PHOTOCATALYTIC APATITE COMPOSITION AS WELL AS PRODUCTION METHOD AND ARTICLE THEREOF

(75) Inventors: Yasuo Naganuma, Kawasaki (JP); Masato Wakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 275 days.

(21) Appl. No.: 11/511,397

(22) Filed: Aug. 29, 2006

(65) Prior Publication Data

US 2007/0232487 A1   Oct. 4, 2007

(30) Foreign Application Priority Data

Mar. 29, 2006   (JP)   ............... 2006-090532

(51) Int. Cl.
| | |
|---|---|
| B01J 27/00 | (2006.01) |
| B01J 23/02 | (2006.01) |
| B01J 23/70 | (2006.01) |
| B01J 23/00 | (2006.01) |
| C01B 15/16 | (2006.01) |
| C01B 25/26 | (2006.01) |

(52) U.S. Cl. .............. 502/208; 502/344; 502/345; 502/347; 502/350; 423/308; 423/311

(58) Field of Classification Search ......... 502/208.344, 502/345, 347, 350; 423/308, 311

See application file for complete search history.

(56) References Cited

U.S. PATENT DOCUMENTS

| | | | | |
|---|---|---|---|---|
| 4,849,223 A | * | 7/1989 | Pratt et al. | ........... 424/409 |
| 5,961,843 A | * | 10/1999 | Hayakawa et al. | ........... 210/748 |
| 5,981,425 A | * | 11/1999 | Taoda et al. | ........... 502/208 |
| 6,180,548 B1 | | 1/2001 | Taoda et al. | |
| 6,777,357 B2 | * | 8/2004 | Aso et al. | ........... 501/1 |
| 2005/0064075 A1 | * | 3/2005 | Wakamura | ........... 426/106 |
| 2007/0051668 A1 | | 3/2007 | Watanabe et al. | |

FOREIGN PATENT DOCUMENTS

| | | | |
|---|---|---|---|
| CN | 1701842 | * | 11/2005 |
| CN | 1899045 | * | 1/2007 |
| DE | 11 2004 002 861 T5 | | 4/2007 |
| JP | 3-90007 A | | 4/1991 |
| JP | 06-172113 | * | 6/1994 |
| JP | 10-33921 A | | 2/1998 |
| JP | 10-244166 A | | 9/1998 |
| JP | 11-156215 A | | 6/1999 |
| JP | 2000-136112 | * | 5/2000 |
| JP | 2001-302220 | * | 10/2001 |
| JP | 2008-050559 | * | 3/2008 |

OTHER PUBLICATIONS

"Apatite-coated titanium dioxide photocatalyst for air purification," T. Nonami et al. Catalysis Today 96 (2004), pp. 113-118.*

(Continued)

*Primary Examiner*—Patricia L Hailey
(74) *Attorney, Agent, or Firm*—Westerman, Hattori, Daniels & Adrian, LLP (57) ABSTRACT

The photocatalytic apatite composition and its production method are disclosed. The photocatalytic apatite comprises a photocatalytic apatite having incorporated into the apatite crystal structure thereof a metal oxide having a photocatalytic action, such as titanium oxide, and a metal ion having an antimicrobial property, such as a silver ion or a copper ion. The photocatalyst apatite composition is capable of maintaining excellent decomposition and adsorption properties for various organic materials such as VOCs or specific adsorbing substances such as a virus for a long time and, at the same time, expressing an excellent antimicrobial property in a dark place as well as under daylight.

14 Claims, 3 Drawing Sheets

FOREIGN PATENT DOCUMENTS

WO      WO 00/06300 A1     2/2000
WO      WO 2007/141324   * 12/2007

OTHER PUBLICATIONS

"Efficient destruction of bacteria with Ti(IV) and antibacterial ions in co-substituted hydroxyapatite films," Chun Hu et al. Applied Catalysis B: Environmental 73 (2007), pp. 345-353.*

"Hydroxyapatite-supported Ag-TiO2 as *Escherichia coli* disinfection photocatalyst," M. Pratap Reddy et al. Water Research 41 (2007), pp. 379-386.*

"Surface composition of calcium hydroxyapatite modified with metal ions," Masato Wakamura et al. Colloids and Surfaces A: Physicochemical and Engineering Aspects 142 (1998), pp. 107-116.*

"Killing bacteria of titanium (IV) and copper co-doped hydroxyapatite film under weak UV light," Chun Hu et al. Acta Scientiae Circumstantiae, vol. 26, No. 2, Feb. 2006, pp. 177-180.*

"Titanium (IV) and silver co-doped hydroxyapatite film for killing bacteria under UV film radiation," Jian Guo et al. Huanjing Huaxue, vol. 26, Issue 2, Mar. 2007, pp. 210-212.*

"Killing bacteria of titanium (IV) and copper co-doped hydroxyapatite film under weak UV light," Chun Hu et al. Acta scientiae Circumstantiae, vol. 26, No. 2, Feburary 2006, pp. 177-180 (English translation provided).*

"Titanium (IV) and silver co-doped hydroxyapatite film for killing bacteria under UV film radiation," Guo Jian et al. Huanjing Huaxue, vol. 26, Issue 2, Mar. 2007, pp. 210-212 (English translation provided).*

Office Action dated Jan. 31, 2008 issued in corresponding German Application No. 10 2006 040 860.8, Yes.

* cited by examiner

PHOTOCATALYTIC APATITE COMPOSITION AS WELL AS PRODUCTION METHOD AND ARTICLE THEREOF

CROSS-REFERENCE TO RELATED APPLICATION

This application is based upon, and claims priority from, Japanese Patent Application No. 2006-090532, filed on Mar. 28, 2006, the contents being incorporated herein by reference.

BACKGROUND OF THE INVENTION

1. Field of the Invention

The present invention relates to a photocatalyst based on apatite. More specifically, the present invention relates to a photocatalytic apatite composition capable of expressing an excellent antimicrobial property in a dark place (in a state that ultraviolet light is not available), and a production method thereof. The present invention also relates to an article using such a photocatalytic apatite composition. The photocatalytic apatite composition of the present invention can be advantageously used for articles such as filters for air cleaners or air conditioners and for wallpaper. These articles are particularly useful in places, where an antimicrobial property is required, such as hospital and healthcare centers.

2. Description of the Related Art

A semiconductor substance such as titanium oxide is known to provide a photocatalytic function. That is, when this semiconductor substance absorbs light energy at a wavelength corresponding to a gap between the valence band and the conduction band, an electron of the valence band transfers to the conduction band, as a result of the excitation, and a hole is generated in the valence band. In the conduction band, assuming that a certain substance (for example, an organic material) is adsorbed at the surface of the semiconductor substance, the electron transferred to this band moves to the organic material on the surface of the semiconductor, thereby reducing the organic material. Also, in the valence band, the hole generated therein captures an electron and thereby oxidizes the organic material. Particularly, in the case of titanium oxide, the hole in the valence band has strong oxidizing power and therefore, can decompose the organic material, finally, into water and carbon dioxide. By using such a photocatalytic function (oxidative decomposition function) of titanium oxide, a titanium oxide film is used as an antimicrobial agent, a germicide, a deodorant, an environment cleaning agent or the like. For example, International Patent Publication No. WO00/06300 describes a method for producing functional materials having photocatalytic functions, such as tiles and sanitary ware, wherein a photocatalyst coating composition comprising a photocatalytic metal oxide such as titanium oxide ($TiO_2$) is coated and then, the substrate surface is rapidly heated to fix the photocatalytic metal oxide on the substrate surface.

In recent years, products where the photocatalyst is also used in the filters of air cleaners or air conditioners are emerging, and titanium oxide is also used as the photocatalyst for the production of such filters. For example, Japanese Unexamined Patent Publication (Kokai) No. 10-33921 describes a filter characterized in that an amorphous calcium phosphate (preferably tricalcium phosphate containing crystal water) and a photo-semiconductor composition (preferably titanium oxide, calcium sulfide or the like) are dispersed and contained in a sheet-like shaped substrate (preferably, paper, woven fabric, nonwoven fabric or plastic foam), or an amorphous calcium phosphate and a photo-semiconductor composition are bonded to such a substrate through an adhesive. However, titanium oxide itself has no adsorption ability and, therefore, in many filters, an adsorbent as represented by activated carbon is used in combination, but an organic material adsorbed on the activated carbon cannot be entirely decomposed by titanium oxide and only an organic material adsorbing to a portion where an activated carbon particle and a titanium oxide particle are present adjacently can be decomposed. Therefore, the decomposition efficiency is low.

On the other hand, it is proposed to use, in place of titanium oxide, a photocatalytic apatite which itself has an adsorption ability. For example, calcium hydroxyapatite $Ca_{10}(PO_4)6(OH)_2$ is a main component of living hard tissue such as teeth or bones and is readily ion-exchangeable with various cations or anions and accordingly, is assured of high biocompatibility and a high adsorption property. The calcium hydroxyapatite, particularly, has an ability of specifically adsorbing an organic material such as a protein. Actually, in contrast with a titanium oxide particle, a photocatalytic apatite can participate in adsorption and decomposition at all portions, and the decomposition efficiency does not decrease.

As for specific examples of the photocatalytic apatite, for example, Japanese Unexamined Patent Publication (Kokai) No. 10-244166 discloses an environment cleaning material and, more specifically, a material for the removal of an offensive odor, the decomposition and removal of a harmful substance or contamination in air, waste-water treatment, water disinfection or the like, wherein a film comprising titanium oxide is formed on the surface of a substrate such as activated carbon, active alumina, silica gel, glass, foamed ceramic or foamed plastic, or a substrate comprising a titanium oxide particle is prepared, and a porous calcium phosphate (preferably hydroxyapatite, apatite fluoride or the like) is coated on the surface of the titanium oxide film or titanium oxide particle.

However, the titanium oxide and the photocatalytic apatite exhibit a problem common to these materials. That is, from the aspect of a antimicrobial property, these materials hardly show an antimicrobial property when disposed in a dark place (for example, in a state that ultraviolet light is not irradiated or ultraviolet light is not present). In the case of the photocatalytic apatite, even when exposed to ultraviolet light, only a slight antimicrobial effect can be recognized.

Further, Japanese Unexamined Patent Publication (Kokai) No. 11-156215 describes an antimicrobial agent (for example, silver apatite) comprising a metal ion-supporting crystalline ion exchanger in which a metal ion such as silver is supported on a support comprising a crystalline ion exchanger such as hydroxyapatite. This silver apatite can exhibit the antimicrobial property but does not have a photocatalytic function by itself and because of a lack in the photocatalytic activity, cannot be used for the removal of VOCs (volatile organic compounds) and the like. Not only the silver apatite but also generally known antimicrobial agents have no function of decomposing a virus and the like and along with accumulation of virus debris or the like during use, the original antimicrobial activity or the like cannot be exerted.

SUMMARY OF THE INVENTION

An object of the present invention is to solve the problems of titanium oxide and photocatalytic apatite heretofore generally used as an antimicrobial agent, thereby further developing the catalytic function of various apatites including calcium hydroxyapatite. That is, an object of the present invention is to provide a photocatalytic apatite capable of maintaining the excellent decomposition and adsorption properties on various organic materials such as VOCs or specific adsorbing substances such as a virus for a long time and at the same time, expressing an excellent antimicrobial property in a dark place as well as under daylight.

Another object of the present invention is to provide a method able to simply and easily produce the excellent photocatalyst apatite of the present invention with high reliability.

Still another object of the present invention is to provide an article or product having a function of maintaining the excellent decomposition and adsorption properties on various organic materials such as VOCs or specific adsorbing substances such as a virus for a long time and a function of expressing the excellent antimicrobial property in a dark place as well as under daylight.

These and other objects of the present invention will be easily understood from the following detailed description.

In one aspect thereof, the present invention resides in a photocatalytic apatite composition comprising a photocatalytic apatite having incorporated into the apatite crystal structure thereof a metal oxide having a photocatalytic action and a metal ion having an antimicrobial property.

In another aspect thereof, the present invention resides in a method for producing a photocatalytic apatite composition comprising a photocatalytic apatite having incorporated into the apatite crystal structure thereof a metal oxide having a photocatalytic action and a metal ion having an antimicrobial property, the production method comprising:

preparing a photocatalytic apatite having incorporated into the apatite crystal structure thereof a metal ion having a photocatalytic action, preparing a solution of a metal salt originated from a metal ion having an antimicrobial property, dipping the photocatalytic apatite in the metal salt solution to perform ion exchange, and thermally treating the resulting reaction product at a temperature of 300° C. or more.

In still another aspect thereof, the present invention resides in a method for producing a photocatalytic apatite composition comprising a photocatalytic apatite having incorporated into the apatite crystal structure thereof a metal oxide having a photocatalytic action and a metal ion having an antimicrobial property, the production method comprising:

preparing a solution comprising starting materials necessary for preparing a photocatalytic apatite having incorporated into the apatite crystal structure thereof a metal ion having a photocatalytic action, and comprising a metal salt derived from a metal ion having an antimicrobial property, reacting the starting materials and the metal salt by a coprecipitation method in the presence of aqueous ammonia, and thermally treating the resulting reaction product at a temperature of 300° C. or more.

In yet still another aspect thereof, the present invention resides in an article having photocatalytic and antimicrobial properties, comprising the photocatalytic apatite composition of the present invention.

According to the present invention, as will be understood from the following detailed description, a photocatalytic apatite capable of expressing the excellent antimicrobial property in a dark place as well as under daylight can be provided. This photocatalytic apatite can exert excellent decomposition and adsorption properties on various organic materials such as VOCs or specific adsorbing substances such as a virus and at the same time, can maintain these properties for a long period of time.

Also, according to the present invention, such a high-performance photocatalytic apatite can be easily and simply produced with high reliability.

Furthermore, according to the present invention, an article or product having a function of maintaining the excellent decomposition and adsorption properties for various organic materials such as VOCs or specific adsorbing substances such as a virus for a long time and a function of expressing the excellent antimicrobial property in a dark place as well as under daylight can be provided by applying the high-performance photocatalytic apatite in the form of a coat or incorporating it into a constituent material. For example, the article of the present invention typically includes an interior material (e.g., wallpaper of houses, automobile interior) and an exterior material. The article of the present invention is excellent in the removal effect on a harmful substance, an offensive odor or a contamination, the antimicrobial property and the like and, in particular, is remarkably excellent in the capability of decomposing a virus or the like and the antimicrobial property, and therefore, can be advantageously used in a place requiring an antimicrobial effect, such as hospital, a clinic, a nursing-care facility and a healthcare center, or in the production of an instrument or the like used in such a facility.

DESCRIPTION OF THE PREFERRED EMBODIMENTS

The photocatalytic apatite composition as well as the production method and article thereof according to the present invention each can be advantageously applied in various embodiments. The preferred embodiments of the present invention are described below, but the present invention is not limited to these embodiments.

The photocatalytic apatite composition of the present invention is characterized in that, in addition to comprising a photocatalytic apatite having incorporated, into the apatite crystal structure thereof, a metal oxide having a photocatalytic action and a metal ion having an antimicrobial property is further doped in the apatite crystal structure.

In the practice of the present invention, the photocatalytic apatite composition can be prepared by an arbitrary method. For example, a photocatalytic apatite having incorporated into the apatite crystal structure thereof a metal oxide having a photocatalytic action (in a manner, a photocatalytic apatite composition precursor) is prepared, for example, by a coprecipitation method, and the objective photocatalytic apatite composition (for example, a silver ion- or copper ion-doped photocatalytic apatite) can be prepared, by a dipping method, by using the obtained photocatalytic apatite and a metal salt derived from a metal ion having an antimicrobial property as the starting materials. In another method, substances necessary for preparing a photocatalytic apatite having incorporated into the apatite crystal structure thereof a metal oxide having a photocatalytic action, and a metal salt derived from a metal ion having an antimicrobial property are used as the stating materials, and the objective photocatalytic apatite composition (for example, a silver ion- or copper ion-doped photocatalytic apatite) can be prepared by reacting these materials by a coprecipitation method.

In the case where a photocatalytic apatite having incorporated into the apatite crystal structure thereof a metal oxide having a photocatalytic action is used as the starting material, the apatite of the photocatalytic apatite can be fundamentally represented by the following formula:

$$A_x(BO_y)_zX$$

In the above formula, A represents a metal atom such as Ca, Co, Ni, Cu, Al, La, Cr, Fe and Mg, B represents an atom such as P and S, and X represents a hydroxyl group (—OH), a halogen atom (e.g., F, Cl) or the like. Examples of such an apatite include, but are not limited to, apatite, hydroxyapatite, fluoroapatite, chloroapatite, tricalcium phosphate and calcium hydrogenphosphate. The apatite usable in the practice of the present invention is preferably hydroxyapatite where X in the formula above is a hydroxyl group, more preferably calcium hydroxyapatite (CaHAP) where X in the formula above is a hydroxyl group and A is calcium (Ca), that is, $Ca_{10}(PO_4)_6(OH)_2$. In the following, the apatite for use in the present invention is described particularly by referring to CaHAP.

In the photocatalytic apatite of the present invention, although other methods may be, if desired, employed, a part of the metal ion in the apatite crystal can be advantageously ion-exchanged with a metal ion having a photocatalytic action by effecting the atomic-level compounding of an apatite and a metal ion having a photocatalytic activity by a coprecipitation method, because, by virtue of introducing ion exchange, an apatite region which is an adsorption site for a specific adsorbing substance such as an organic material, and an adsorbing substance decomposition site depended on the photocatalytic action can be mixed on the same crystal plane in an atomic-level scale and, therefore, the adsorption and decomposition of the adsorbing substance can be uniformly and efficiently performed at the same time.

The photocatalytic apatite can be prepared in various forms. For example, the photocatalytic apatite may be formed in various powder forms differing in the particle diameter according to the preparation conditions but depending on the case, may be formed as a thin film on an arbitrary substrate.

In the case of ion-exchanging a part of the metal ion in the apatite crystal with a metal ion of a water-soluble metal salt having a photocatalytic action, various water-soluble metal salts, known to be useful in this technical field, may be used as the water soluble metal salt having a photocatalytic action, but a water-soluble metal salt of a metal such as titanium zirconium, iron and tungsten may be preferably used.

According to the finding of the present inventors, in the case of performing the ion exchange by using a water-soluble metal salt, the content of the metal salt of the water-soluble metal salt is usually 15 mol % as a maximum in terms of the ratio to the metal ion in the apatite crystal, though this may be widely changed depending on the desired result. In general, the metal ion content is preferably from 3 to 11 mol %, and most preferably around 10 mol % or less, in terms of the ratio to the metal ion such as a Ca ion.

In the photocatalytic apatite composition of the present invention, a metal ion having an antimicrobial property is further doped in the apatite crystal structure of the above-described photocatalytic apatite. After intensive studies to solve the problem that the photocatalytic apatite has no antimicrobial property, the present inventors have found it effective to dope a metal ion having an antimicrobial property, such as silver ion or copper ion, into the photocatalytic apatite. The present invention has been accomplished based on this finding.

Preferred examples of the metal ion having an antimicrobial property include a silver ion and a copper ion. These metal ions may be used alone, or two or more species thereof may be used in combination. Also, it is usually advantageous to use such a metal ion in the form of a metal salt as a solution thereof. For example, a metal salt such as a nitrate and an ammonium salt is advantageously used, and the solution of the metal salt is usually an aqueous solution.

In the case of doping such a metal ion into the apatite crystal structure, two main methods, that is, a dipping method and a coprecipitation method, can be used by selecting whichever is desired according to the situation. These methods are described in greater detail below, but when a photocatalytic apatite having incorporated into the apatite crystal structure thereof a metal oxide having a photocatalytic action is already prepared or commercially available and this photocatalytic apatite is used as the starting material, a dipping method is employed. For example, an already prepared or commercially available photocatalytic apatite is dipped in an aqueous solution containing a metal ion having an antimicrobial property (for example, a silver ion or a copper ion), stirred for several minutes by a stirrer, filtered, washed, dried and heat-treated (usually, at least at 300° C.), whereby a photocatalytic apatite powder doped with silver ion or copper ion can be obtained. The metal ion source is preferably a nitrate such as silver nitrate (in the case of a silver ion) or copper nitrate (in the case of a copper ion).

The concentration of the aqueous silver nitrate or copper nitrate solution in which the photocatalytic apatite is dipped may be varied over a wide range according to the starting material used or the treating conditions, but usually, the concentration is preferably from about $1 \times 10^{-5}$ to $1 \times 10^{-2}$ mol, more preferably from about $1 \times 10^{-4}$ to $1 \times 10^{-3}$ mol. Also, usually, the stirring time for stirring by a stirrer is preferably on the order of 3 to 5 minutes. If the concentration of the aqueous silver nitrate or copper nitrate solution is excessively high, the antimicrobial property may be enhanced but the photocatalytic activity decreases, whereas if the concentration of the aqueous silver nitrate or copper nitrate solution is too low, high photocatalytic activity may be obtained but the antimicrobial property decreases. The temperature at the thermal treatment is usually at least 300° C., preferably from 300 to 700° C. Incidentally, the ion exchange itself can proceed at a very high speed and therefore, even when the stirring is performed for 5 minutes or more, there is no difference in the effect obtained.

On the other hand, when a photocatalytic apatite having incorporated into the apatite crystal structure thereof a metal ion having a photocatalytic action is not prepared and the process is started from substances (for example, calcium nitrate and titanium sulfate) necessary for the production thereof, a coprecipitation method is employed. For example, aqueous ammonia is added to an aqueous solution containing calcium nitrate, phosphoric acid, titanium sulfate and silver nitrate or copper nitrate, and after a coprecipitation treatment, ripening, filtration, washing, drying and thermal treatment (usually, at least at 300° C.) are performed, whereby a photocatalytic apatite powder doped with silver ion or copper ion can be obtained. The temperature at the thermal treatment is usually at least 300° C., preferably from 300 to 700° C.

The photocatalytic apatite prepared by the above-described means (dipping method or coprecipitation method) can exhibit an excellent antimicrobial property in a dark place, as is clearly revealed by the following. When this photocatalytic apatite was evaluated by a vapor-phase decomposition test using acetaldehyde, according to the concentration of silver ion or copper ion doped, the photocatalytic activity obtained could be from 10 to 80% of that of a photocatalyst apatite having no antimicrobial activity, and a satisfactory photocatalytic activity could be confirmed. Furthermore, as for the antimicrobial property, it could be confirmed that only a silver ion-doped photocatalytic apatite can decrease the number of *coli* bacteria in a dark place.

Accordingly, in addition to the photocatalytic apatite composition, the present invention resides in a method for producing a photocatalytic apatite composition comprising a photocatalytic apatite having incorporated into the apatite crystal structure thereof a metal oxide having a photocatalytic action and a metal ion having an antimicrobial property.

In one aspect thereof, the production method of a photocatalytic apatite composition of the present invention comprises:

preparing a photocatalytic apatite having incorporated into the apatite crystal structure thereof a metal ion having a photocatalytic action, preparing a solution of a metal salt originated from a metal ion having an antimicrobial property, dipping the photocatalytic apatite in the metal salt solution to perform ion exchange, and thermally treating the resulting reaction product at a temperature of 300° C. or more.

Figure 1:
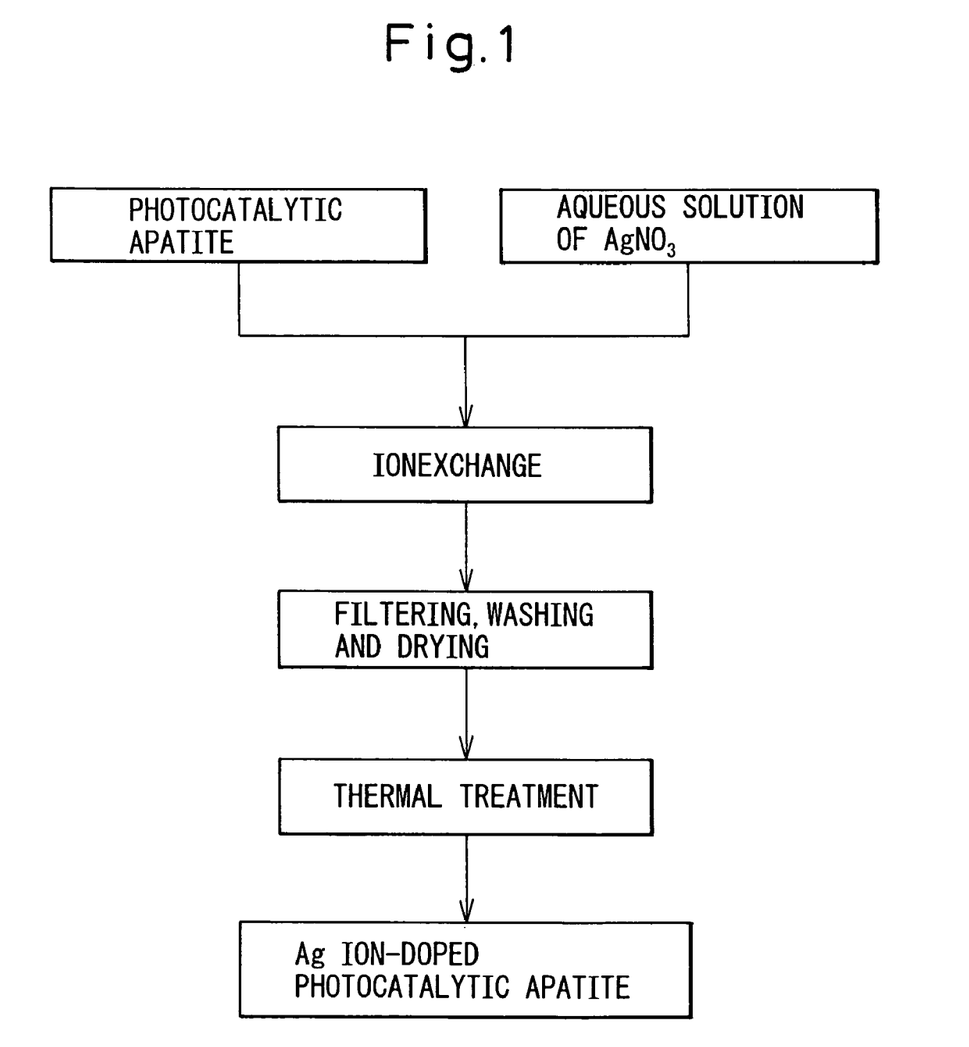
FIG. 1 is a flow chart showing one preferred embodiment of the production method of a photocatalytic apatite composition according to the present invention.

This production method of a photocatalytic apatite composition can be explained, for example, by referring to FIG. 1.

First, a photocatalytic apatite and an aqueous silver nitrate solution are prepared. The photocatalytic apatite is usually a powder, and a powder having a particle diameter allowing for easy stirring, for example, a particle diameter of about 0.1 to 100 μm, is preferred. The photocatalytic apatite may be a commercially available product or may be prepared for the practice of the present invention. The aqueous silver nitrate solution may be used in various concentrations but usually, is preferably used in a concentration of about $1 \times 10^{-5}$ to $1 \times 10^{-3}$ mol.

Subsequently, the photocatalytic apatite is added to the aqueous silver nitrate solution and carefully stirred to cause uniform decomposition. The stirring time is from about 3 to 8 minutes. During the stirring step, ion exchange proceeds between photocatalytic apatite and silver nitrate, and a precipitate is produced. The produced precipitate is collected by filtration and washed with ion-exchanged water or distilled water to remove the nitric acid portion.

After the completion of washing, the solid content is dried in an oven at a temperature of about 80 to 120° C. After the sufficient drying is completed, a thermal treatment is further performed. The thermal treatment is performed in an electric furnace at a temperature of about 300 to 700° C. for around 1 hour. Through such a series of treating steps, a silver ion-doped photocatalytic apatite can be obtained. Incidentally, an aqueous silver nitrate solution is used here as the starting material, but when an aqueous copper nitrate solution is used instead, a copper ion-doped photocatalytic apatite can be obtained.

In another aspect thereof, the production method of a photocatalytic apatite composition of the present invention comprises:

preparing a solution comprising starting materials necessary for preparing a photocatalytic apatite having incorporated into the apatite crystal structure thereof a metal ion having a photocatalytic action, and comprising a metal salt derived from a metal ion having an antimicrobial property, reacting the starting materials and the metal salt by a coprecipitation method in the presence of aqueous ammonia, and thermally treating the resulting reaction product at a temperature of 300° C. or more.

Figure 2:
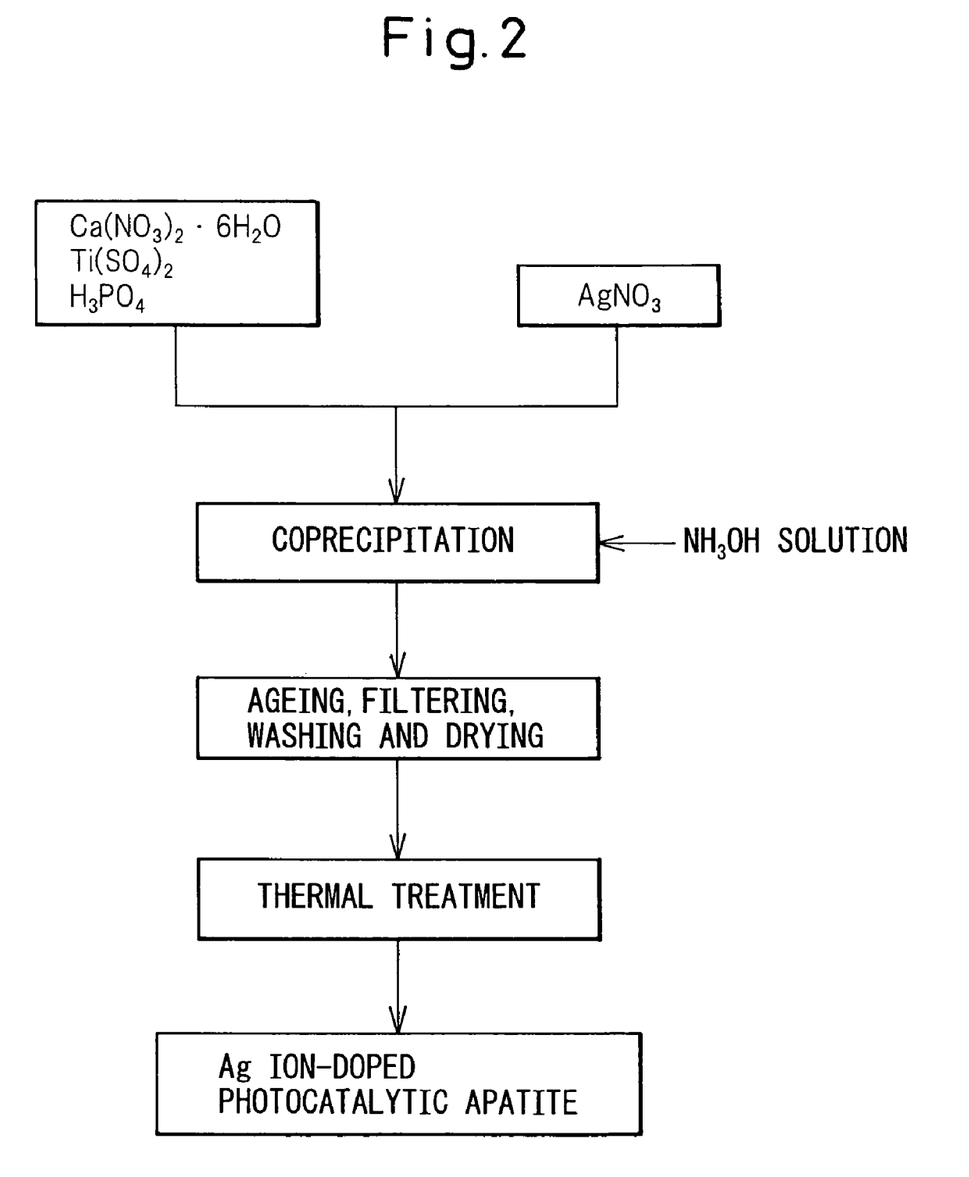
FIG. 2 is a flow chart showing another preferred embodiment of the production method of a photocatalytic apatite composition according to the present invention.

This production method of a photocatalytic apatite composition can be explained, for example, by referring to FIG. 2.

First, starting materials necessary for the preparation of a photocatalytic apatite, and an aqueous silver nitrate solution are prepared. Then, calcium nitrate and titanium sulfate as the starting materials for a photocatalytic apatite, each in a predetermined amount, are mixed in pure water subjected to a decarbonation treatment. At this time, for example, assuming that the predetermined amount is $X_{metal}$, this is an amount satisfying the condition of $X_{metal}=Ti/(Ti+Ca)=0.03$ to $0.11$ (molar ratio). In this definition, the metal atom exchanged is Ti and the metal atom (corresponding to A in apatite represented by the formula above) of apatite is Ca, but this definition is effective for other combinations of metals employable in the practice of the present invention. The total concentration of a metal such as Ti and a metal such as Ca is preferably adjusted to 0.1 mol. Subsequently, a phosphoric acid is added to the resulting mixture, but if desired, the phosphoric acid may be mixed almost at the same time with calcium nitrate and titanium sulfate. Furthermore, aqueous ammonia is added to adjust the pH value for a coprecipitation treatment. The pH value here is preferably about 9.

After the completion of the coprecipitation treatment, the obtained suspension is ripened (aging). The aging may be performed, for example, at about 100° C. over 6 hours. The produced precipitate is collected by filtration and washed with ion-exchanged water or distilled water to remove the nitric acid portion.

After the completion of washing, the solid content is dried in an oven at a temperature of about 80 to 120° C. After sufficient drying is completed, a thermal treatment is further performed. The thermal treatment is performed in an electric furnace at a temperature of about 300 to 700° C. for around 1 hour. Through such a series of treating steps, a silver ion-doped photocatalytic apatite can be obtained. Incidentally, an aqueous silver nitrate solution is used here as the starting material, but when an aqueous copper nitrate solution is used instead, a copper ion-doped photocatalyst apatite can be obtained.

The antimicrobial metal-doped photocatalytic apatite of the present invention may be provided in various shapes and dimensions according to the usage, production conditions or other factors. Examples of the suitable shape include a particle, a tablet, a rod, a plate, a block, a sheet, a film and a thin film. In the case where the apatite is a sheet, a film, a thin film or the like, such a material may be used by itself or may be combined with a substrate and used in the form of the apatite being applied on one surface or both surfaces of the substrate as a coat or film so as to constitute a highly functional composite structure. Examples of the substrate used here include, but are not limited to, a foil, a film, a sheet and a plate of various materials such as paper (including synthetic paper and the like), woven or nonwoven fabric, wood, glass, metal, ceramic and plastic. Such a substrate may be porous, if desired. The metal-doped photocatalytic apatite of the present invention can be advantageously used particularly in the form of being formed as a thin film on the surface of a substrate or being kneaded in a substrate.

In addition to the antimicrobial metal-doped photocatalytic apatite and the production method thereof, the present invention resides in an article using such a photocatalytic apatite. Examples of the article of the present invention include, but are not limited to, a filter for an air cleaner, an air condition and a hot-air heater, an interior or exterior material such as wallpaper and a building material, and an automobile interior. Furthermore, by making use of the excellent antimicrobial property, for example, the article of the present invention can be advantageously used also for an interior material of a hospital, a clinic, a nursing-care facility and the like, and for fixtures used in such a facility. As a matter of course, if desired, the article of the present invention may be a computer peripheral such as a keyboard, a mouse, a housing and a touch panel.

EXAMPLES

The present invention is further described below by referring to the examples, but the present invention is, of course, not limited to these examples.

Example 1

In this example, a silver ion-doped photocatalytic apatite was prepared by the dipping method.

First, 3 g of a commercially available photocatalytic apatite (Ti—CaHAP, "PHOTOHAP PCAP-100", trade name, produced by Taihei Chemical Industrial Co., Ltd., white powder, average particle diameter: from 3 to 8 µm) was added to 300 milliliter (mL) of an aqueous silver nitrate solution ($1 \times 10^{-5}$ mol) and stirred by a magnetic stirrer for 5 minutes, and the produced precipitate was filtered, washed with pure water, thoroughly dried in an oven at 100° C., and then thermally treated in an electric furnace at 650° C. for 1 hours. The obtained product was analyzed and confirmed to be a silver ion-doped photocatalytic apatite (Ti—CaHAP).

Example 2

In this example, a silver ion-doped photocatalytic apatite was prepared by the coprecipitation method.

First, 1 L of pure water subjected to decarbonation was prepared, and 0.1 mol of calcium nitrate, titanium sulfate in a different amount of giving Ti/(Ti+Ca) of 0.1 (molar ratio), 0.06 mol of phosphoric acid and 300 mL of an aqueous silver nitrate solution ($1 \times 10^{-5}$ mol) were added to the pure water in a nitrogen atmosphere. The obtained mixture was carefully mixed, and the pH value of the mixture was then adjusted to 9.0 by adding 15 mol/L of aqueous ammonia. Subsequently, the obtained suspension was transferred to a Teflon (registered trademark) bottle and ripened at 100° C. over 6 hours. The suspension in which a precipitate was produced was filtered, and the precipitate collected by filtration was washed with 5 L of pure water and dried in a dry oven at 70° C. for 12 hours. The obtained product was analyzed and confirmed to be a silver ion-doped photocatalytic apatite (Ti—CaHAP).

Evaluation Test Examples

The photocatalytic apatite was then subjected to evaluations of photocatalytic activity and antimicrobial property in a dark place according to the following procedures.

[Evaluation of Photocatalytic Activity]

(1) Preparation of Samples

For use in the evaluation test, the following five types of samples comprising a commercially available Ti—CaHAP or a silver ion-doped Ti—CaHAP produced by the production method of Example 1 or 2 were prepared.

Sample I:
Silver ion-doped Ti—CaHAP (Ca/Ti/Ag=9/0.9/1), produced by the coprecipitation method.

Sample II:
Silver ion-doped Ti—CaHAP (silver nitrate concentration: $1 \times 10^{-3}$ mol), produced by the dipping method.

Sample III:
Silver ion-doped Ti—CaHAP (silver nitrate concentration: $1 \times 10^{-4}$ mol), produced by the dipping method.

Sample VI:
Silver ion-doped Ti—CaHAP (silver nitrate concentration: $1 \times 10^{-5}$ mol), produced by the dipping method.

Sample V:
Ti—CaHAP (trade name "PHOTOHAP PCAP-100", produced by Taihei Chemical Industrial Co., Ltd.)

Each sample was press-shaped to form a plate-like specimen (50 mm (width)×70 mm (length)).

(2) Evaluation Test

A 500 mL-volume desiccator with a quartz glass cap was prepared. After placing a specimen therein, the cap was secured to tightly close the desiccator. Synthetic air (nitrogen: 70%, oxygen: 30%) was introduced from the gas inlet to displace the inside of the closed desiccator with the synthetic air. Acetaldehyde ($CH_3CHO$) was charged into a glass washing bottle, and acetaldehyde generated by bubbling synthetic air was trapped in a Tedlar (registered trademark) bag for sampling. Then, 6 mL of acetaldehyde gas was injected by a syringe into the desiccator after displacement with synthetic air, and the acetaldehyde concentration in the desiccator was adjusted to about 10,000 ppm by using a syringe. The desiccator was left standing in a dark place for about 2 hours to reach adsorption equilibrium.

Subsequently, gas in the desiccator was removed (1 mL) by a syringe, and the concentrations of acetaldehyde gas and carbon dioxide gas or carbonic acid gas ($CO_2$) generated resulting from the decomposition of acetaldehyde were measured by gas chromatography. A carbon dioxide concentration (initial) plotted in FIG. 3 was obtained. The desiccator was further continuously left standing in a dark place for 1 hour, and then the same measurement as above was performed, as a result, a carbon dioxide concentration (dark place 1H) plotted also in FIG. 3 was obtained. Thereafter, ultraviolet light in an amount of 1 mW/cm² was irradiated from above the desiccator for 1 hour, 2 hours, 3 hours, 4 hours and 5 hours. The light source was a black light. The same measurement as above was performed every irradiation, as a result, carbon dioxide concentrations (UV-1H to UV-5H) plotted in FIG. 3 were obtained.

Figure 3:
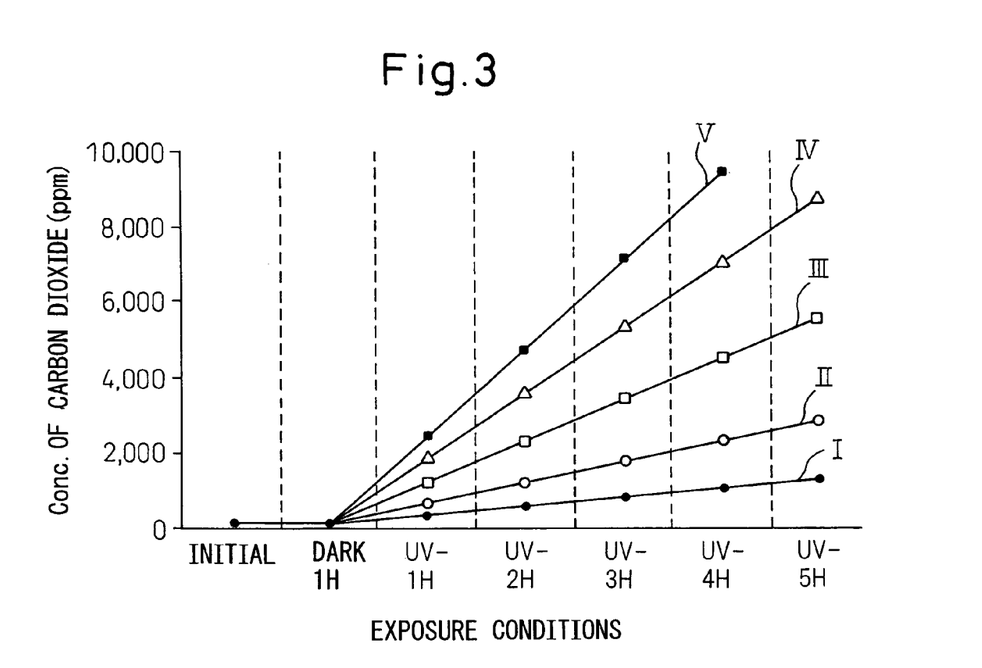
FIG. 3 is a graph plotting the evaluation results of photocatalytic activity of different silver-doped photocatalytic apatites produced in the examples.

From the evaluation results plotted in FIG. 3, it was confirmed that the photocatalytic activity of the photocatalytic apatite (silver ion-doped Ti—CaHAP) according to the present invention is about 80% of that of the chemically synthesized photocatalytic apatite available on the market (T-CaHAP, Sample V), but the photocatalytic apatite has good characteristics.

[Evaluation of Antimicrobial Property in Dark Place]

(1) Preparation of Samples

For use in the evaluation test, five types of the following samples were prepared by using Sample II (silver-doped Ti—CaHAP) prepared in the evaluation test of photocatalytic activity or Sample V (Ti—CaHAP).

Sample A:
A coating material for this test was prepared by giving a special order to a coating material manufacturer. For the purpose of comparison, the blending of a photocatalytic apatite was omitted.

Sample B:
Sample V (Ti—CaHAP) was blended in an amount of 5% with the coating material of Sample A.

Sample C:

Sample V (Ti—CaHAP) was blended in an amount of 10% with the coating material of Sample A.

Sample D:

Sample II (silver-doped Ti—CaHAP) was blended in an amount of 5% with the coating material of Sample A.

Sample E:

For the purpose of comparison, PE (polyethylene) was used in place of the coating material.

(2) Evaluation Test

This test was performed by preparing a specimen according to the test method described in Antimicrobial Activity Evaluation Test Method III of Antimicrobial Products, compiled by Society of Industrial Antimicrobial Articles (2003 edition). Incidentally, the antimicrobial activity of the specimen was tested by using the following one bacterial species:

coli bacterium: Escerichia coli NBRC3972.

Figure 4:
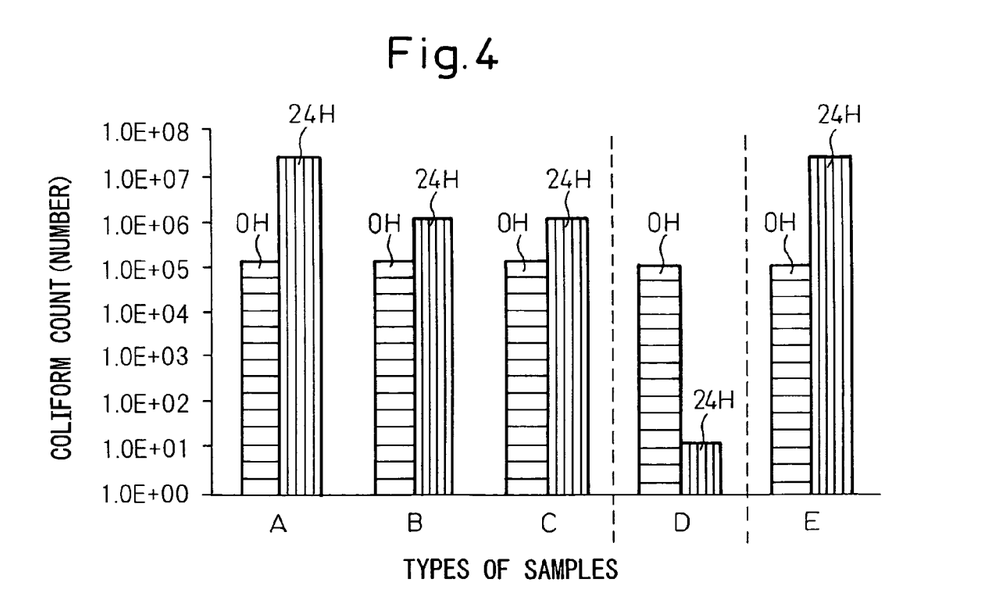
FIG. 4 is a graph plotting the evaluation results of antimicrobial property, in a dark place, of different silver-doped photocatalytic apatites produced in the examples.

With respect to each specimen, the change in the number of coli bacteria was examined at the initial (0 H) and after 24 hours (24 H), as a result, the measurement results plotted in FIG. 4 were obtained. As seen from the evaluation results plotted in FIG. 4, among the coating materials having kneaded therein a photocatalyst powder in an amount of 5%, the number of coli bacteria is significantly decreased only in the coating material using the silver ion-doped photocatalytic apatite.

The invention claimed is:

1. A photocatalytic apatite composition comprising a photocatalytic apatite having incorporated into the apatite crystal structure thereof a metal oxide having a photocatalytic action and a metal ion having an antimicrobial property;

wherein a part of the metal ion in the apatite crystal is ion-exchanged with a metal ion having a photocatalytic action, and a metal ion having an antimicrobial property is doped in the apatite crystal structure of the photocatalytic apatite, and     wherein the metal ion is doped into the apatite crystal structure by a dipping method or a coprecipitation method, and after the metal ion is doped into the apatite crystal structure, the photocatalytic apatite is further thermally treated at a temperature of 300° or more.

2. The photocatalytic apatite composition as defined in claim 1, wherein the metal ion is a silver ion and/or a copper ion.

3. The photocatalytic apatite composition as defined in claim 1, wherein the metal ion constituting the metal oxide is titanium.

4. The photocatalytic apatite composition as defined in claim 1, wherein the metal ion is contained in an amount of 10 mol % or less in terms of the ratio to the metal ion in the apatite crystal.

5. The photocatalytic apatite composition as defined in claim 1, wherein the apatite is calcium hydroxyapatite.

6. The photocatalytic apatite composition as defined in claim 1, which takes the form of a powder.

7. The photocatalytic apatite composition as defined in claim 1, which takes the form of a coating material.

8. An article having photocatalytic and antimicrobial properties, comprising the photocatalytic apatite composition defined in claim 1.

9. The article as defined in claim 8, wherein the photocatalytic apatite composition is coated as a thin film on the surface of the article.

10. The article as defined in claim 8, wherein the photocatalytic apatite composition is blended in the constituent material of the article.

11. A method for producing a photocatalytic apatite composition comprising a photocatalytic apatite having incorporated into the apatite crystal structure thereof a metal oxide having a photocatalytic action and a metal ion having an antimicrobial property, the production method comprising:

preparing a photocatalytic apatite having incorporated into the apatite crystal structure thereof a metal ion having a photocatalytic action,     preparing a solution of a metal salt originated from a metal ion having an antimicrobial property,     dipping the photocatalytic apatite in the metal salt solution to perform ion exchange, and     thermally treating the resulting reaction product at a temperature of 300° or more;

wherein a part of the metal ion in the apatite crystal is ion-exchanged with a metal ion having a photocatalytic action, and a metal ion having an antimicrobial property is doped in the apatite crystal structure of the photocatalytic apatite.

12. The method for producing a photocatalytic apatite composition as defined in claim 11, wherein the metal ion is silver ion and/or copper ion.

13. The method for producing a photocatalytic apatite composition as defined in claim 11, wherein the apatite is calcium hydroxyapatite.

14. A method for producing a photocatalytic apatite composition comprising a photocatalytic apatite having incorporated into the apatite crystal structure thereof a metal oxide having a photocatalytic action and a metal ion having an antimicrobial property, the production method comprising:

preparing a solution comprising starting materials necessary for preparing a photocatalytic apatite having incorporated into the apatite crystal structure thereof a metal ion having a photocatalytic action, and comprising a metal salt derived from a metal ion having an antimicrobial property,     reacting the starting materials and the metal salt by a coprecipitation method in the presence of aqueous ammonia, and     thermally treating the resulting reaction product at a temperature of 300° or more;

wherein a part of the metal ion in the apatite crystal is ion-exchanged with a metal ion having a photocatalytic action, and a metal ion having an antimicrobial property is doped in the apatite crystal structure of the photocatalytic apatite.

\* \* \* \* \*